US012558581B2

(12) United States Patent
Kils et al.

(10) Patent No.: US 12,558,581 B2
(45) Date of Patent: Feb. 24, 2026

(54) CONVERTIBLE HARNESS

(71) Applicant: CMC Rescue, Inc., Goleta, CA (US)

(72) Inventors: Ole Kils, Goleta, CA (US); Tyler J. Mayer, Carpinteria, CA (US); Lonnie A. Waggoner, Boulder, CO (US)

(73) Assignee: CMC RESCUE, INC., Goleta, CA (US)

( * ) Notice: Subject to any disclaimer, the term of this patent is extended or adjusted under 35 U.S.C. 154(b) by 1166 days.

(21) Appl. No.: 17/445,301

(22) Filed: Aug. 17, 2021

(65) Prior Publication Data

US 2022/0054872 A1 Feb. 24, 2022

Related U.S. Application Data

(60) Provisional application No. 63/067,740, filed on Aug. 19, 2020.

(51) Int. Cl.
*A62B 35/00* (2006.01)

(52) U.S. Cl.
CPC ...... *A62B 35/0031* (2013.01); *A62B 35/0012* (2013.01); *A62B 35/0018* (2013.01); *A62B 35/0037* (2013.01)

(58) Field of Classification Search
CPC . A62B 35/00; A62B 35/0031; A62B 35/0012; A62B 35/0018; A62B 35/0037; A62B 35/0025; A62B 35/0006
USPC .................................. 182/3, 6, 7; 244/151 R
See application file for complete search history.

(56) References Cited

U.S. PATENT DOCUMENTS 1,642,911 A * 9/1927 Thurnau ............ A62B 35/0006 224/268
2,159,857 A * 5/1939 Mix ........................ A41F 9/002 2/322
2,979,028 A * 4/1961 Zakely ............... A62B 35/0018 297/484

(Continued)

FOREIGN PATENT DOCUMENTS

DE 2824734 A1 * 12/1979
DE 3632537 A1 * 4/1988

(Continued)

OTHER PUBLICATIONS

EP 1527800 English translation (Year: 2005).*

*Primary Examiner* — Janet M Wilkens
(74) *Attorney, Agent, or Firm* — McCoy Russell LLP

(57) ABSTRACT

A convertible harness system which may be selectively transitioned between a utility belt, sit-harness, and full body harness, is herein disclosed. The convertible harness system may include a utility belt, a leg loop assembly, and a chest harness, wherein the leg loop assembly may be reversibly coupled to the utility belt by passing a primary attachment point of the leg loop assembly through an attachment slot/opening in the utility belt and securing the primary attachment point to the utility belt by girth-hitching the primary attachment point to the utility belt using a primary attachment loop coupled to the primary attachment point. The convertible harness system disclosed herein may enable a wearer rapidly and reversibly couple a leg loop assembly to a utility belt, without removing or unbuckling the utility belt, and without use of a carabiner or other conventional locking device.

19 Claims, 5 Drawing Sheets

(56) References Cited

U.S. PATENT DOCUMENTS

| | | | | | |
|---|---|---|---|---|---|
| 4,406,043 | A * | 9/1983 | Friedman | A44B 11/006 24/182 |
| 6,189,651 | B1 | 2/2001 | Sadeck | |
| 6,283,248 | B1 * | 9/2001 | Groover | A62B 35/0025 182/7 |
| 6,481,528 | B2 | 11/2002 | Antonio | |
| 6,766,532 | B1 * | 7/2004 | Cabana | A61F 5/028 2/310 |
| 8,235,173 | B2 | 8/2012 | Kopp | |
| 8,434,722 | B2 * | 5/2013 | Fradet | B64D 17/64 244/148 |
| 8,918,967 | B2 * | 12/2014 | Berge | B64D 17/38 244/151 B |
| 9,168,401 | B2 * | 10/2015 | Botti | A62B 35/0025 |
| 10,765,437 | B1 * | 9/2020 | Antonio | A61B 17/1325 |
| 2005/0072530 | A1 * | 4/2005 | Petzl | A62B 35/0012 160/3 |
| 2007/0272484 | A1 * | 11/2007 | Helms | A62B 35/0037 182/3 |
| 2010/0300802 | A1 | 12/2010 | Kopp | |
| 2018/0071557 | A1 * | 3/2018 | Bouquier | A62B 35/0012 |
| 2020/0009411 | A1 * | 1/2020 | Antonio | A61B 17/1327 |
| 2024/0416159 | A1 * | 12/2024 | Bouquier | A62B 35/0025 |

FOREIGN PATENT DOCUMENTS

| | | | | |
|---|---|---|---|---|
| DE | 202010009959 | U1 * | 11/2010 | A45F 3/14 |
| EP | 1527800 | A2 * | 5/2005 | A62B 1/04 |
| EP | 2420291 | A1 * | 2/2012 | A62B 35/00 |
| EP | 2984954 | A1 * | 2/2016 | A41D 13/0007 |
| ES | 1225700 | U * | 2/2019 | |
| FR | 2796296 | A1 * | 1/2001 | A62B 35/0025 |
| WO | WO-2023245250 | A1 * | 12/2023 | A45F 3/14 |

* cited by examiner

CONVERTIBLE HARNESS

CROSS REFERENCE TO RELATED APPLICATIONS

The present application claims priority to U.S. Provisional Application No. 63/067,740, entitled "CONVERTIBLE HARNESS", filed on Aug. 19, 2020. The entire contents of the above-listed application are hereby incorporated by reference for all purposes.

FIELD

The present description relates generally to a harness system convertible between a utility belt, sit-harness, and a full body harness.

BACKGROUND/SUMMARY

Utility belts provide a means of storage for tools or weapons, and may provide a wearer with an attachment point by which the wearer may secure themselves to a structure or object. Utility belts may be employed in hunting, search and rescue, rope access work, tactical operations. Sit-harnesses, which enable a wearer to securely attach to an anchor, rope, tower, etc., may be employed in similar contexts as utility belts, and several attempts have been made to combine the functionality of utility belts and sit-harnesses. In particular, a utility belt which may be quickly converted to a sit-harness configuration is generally desired, as this may provide the functionality of both a sit-harness and a utility belt, at reduced weight and size. In one example, Kopp in In U.S. Pat. No. 8,235,173, teaches a belt system convertible into and out of a sit harness configuration for selective use as a harness or a utility belt. The convertible belt/harness system of Kopp employs a carabiner to reversibly couple a leg loop assembly to a waistband of the utility belt, thereby enabling a wearer to attach or remove the leg loop assembly as desired.

However, the inventors herein have identified issues with the above belt system. In one example, as a single carabiner is used both to reversibly couple the leg loop assembly to the waistband, and as the primary attachment point of the harness, the carabiner may accommodate a reduced number of connections, as at least a portion of the carabiner is already occupied by connection to the leg loop assembly. In another example, as the carabiner is actuatable to an open configuration, there is a potential for the carabiner to inadvertently open. In another example, the carabiner may become cross loaded when additional loads are attached thereto, which may increase a probability of carabiner failure.

The inventors herein have developed systems and methods which may at least partially address one or more of the above identified issues. In one example, a harness system, comprising, a utility belt, including a waistband comprising a first webbing and a second webbing, wherein the first webbing and the second webbing overlap at least along a front portion of the waistband, and an attachment slot comprising a passage between the first webbing and the second webbing in the front portion of the waistband, and a leg loop assembly reversibly coupled to the utility belt, comprising, a right leg loop, a left leg loop, an attachment loop, and a primary attachment point, wherein the right leg loop, the left leg loop, and the attachment loop, are coupled to the primary attachment point, and wherein the leg loop assembly is reversibly coupled to the utility belt via insertion of the primary attachment point through the attachment slot and girth-hitching of the primary attachment point to the waistband via the attachment loop. By reversibly coupling the leg loop assembly to the waistband via girth-hitching of the primary attachment point to the attachment slot, a greater number of attachments may be made to the primary attachment point, as it is the attachment loop, not the primary attachment point, which forms the connection between the leg loop assembly and the utility belt. Further, as the primary attachment point comprises a closed ring, not a carabiner or other openable device, there is a reduced probability of inadvertently opening the primary attachment point.

In another example, one or more of the above identified issues may be at least partially addressed by a method comprising, coupling a utility belt to a leg loop assembly by, inserting a primary attachment point of the leg loop assembly through an attachment slot in the utility belt by passing the primary attachment point through a first opening of the attachment slot until the primary attachment point protrudes from a second opening of the attachment slot, and passing an attachment loop out of the first opening of the attachment slot, around an outer length of the attachment slot, and around a neck of the primary attachment point, wherein the attachment loop is coupled to the primary attachment point. In this way, a leg loop assembly may be rapidly and reversibly coupled to a utility belt, without relying on additional pieces of hardware, such as carabiners, or other openable devices which may require additional time to open, close, and lock.

It should be understood that the above summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
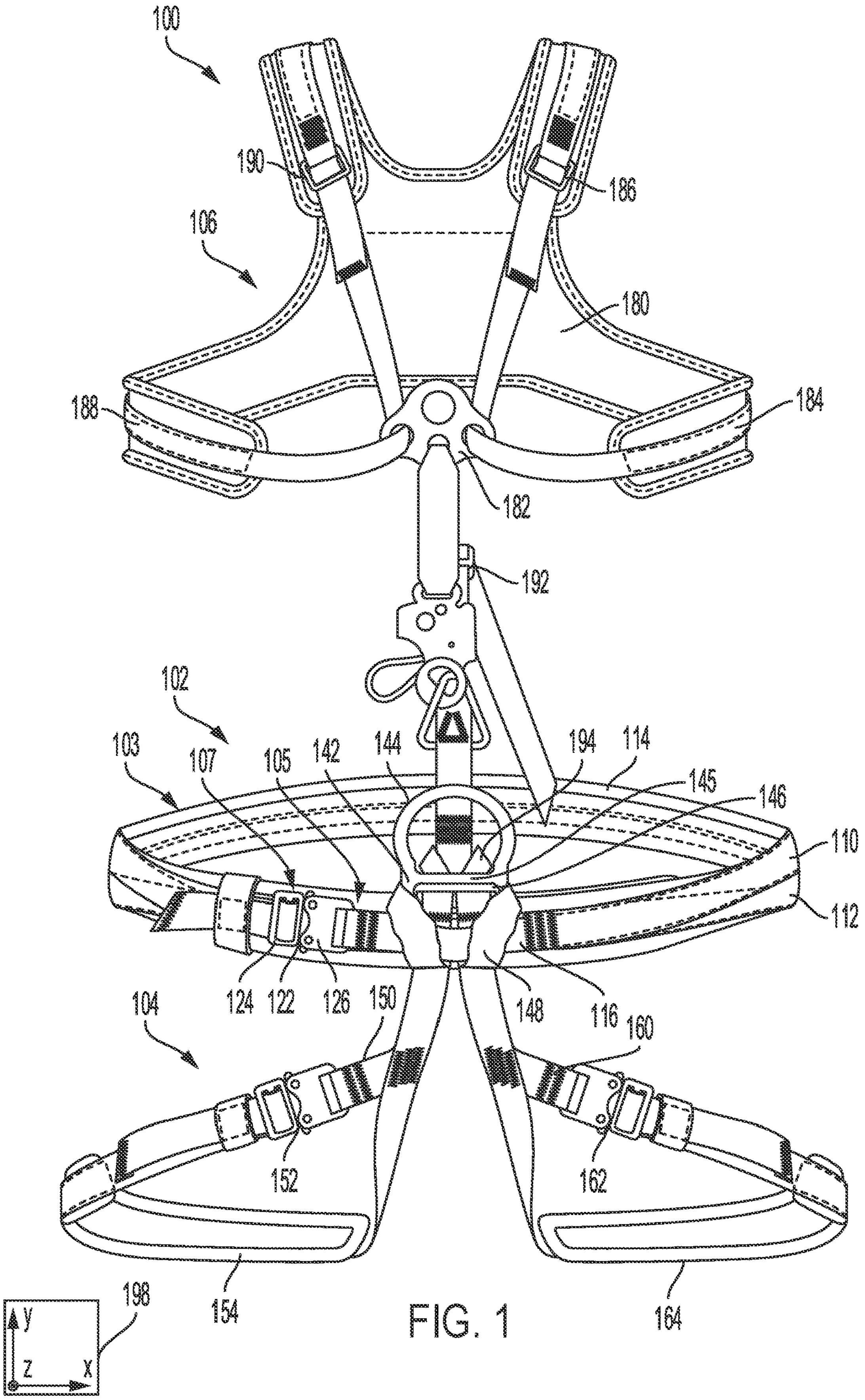
FIG. 1 shows an example of a convertible harness system.

The following description relates to convertible harness systems, and methods of using said convertible harness systems. Conventionally, utility belts, sit-harnesses, and full body harnesses, are three separate pieces of equipment, each suited for distinct use cases, but each having some degree of overlap in functionality. In one example, in comparison to full body harnesses, sit-harnesses are smaller, lighter, more portable, and more easily/quickly put-on and removed, however, full body harnesses provide additional comfort (when hanging from a full body harness a wearer's weight is distributed amongst a greater number of contact points, reducing pressure on any single contact point), stability (the greater number of contact points between the full body harness and the wearer's body inhibits rotation/spinning of the a wearer), attachment points (e.g., a full body harness may provide more attachment points for clipping into an anchor, a rope, another person, or gear), and the ability to support an unconscious user. Thus, a user may face a choice between packing additional weight (to bring each of the 3 pieces of equipment), or foregoing utility (e.g., deciding not to bring a particular piece of equipment to reduce weight). This dilemma may be exacerbated in rescue or tactical operations, where packing light may be preferred, but where the demands of the rescue or tactical operation may be difficult to predict. Thus, in conventional systems, it may be difficult to determine if a particular piece of equipment should be included on a mission. Further, conventional systems may be ill suited to adapting to a changing situation on the fly. As an example, if a user needs to transition from a utility belt to a sit-harness, the user may need to first remove the utility belt before donning the sit-harness. This may consume substantial time, as gear may need to be transferred from the utility belt to the sit-harness, and as the user may need to first find an appropriate location before switching from utility belt to sit-harness.

Kopp in In U.S. Pat. No. 8,235,173, attempts to address some of the above issues. Kopp teaches a belt system convertible into and out of a sit-harness configuration for selective use as a harness or a utility belt. The convertible belt/harness system of Kopp employs a carabiner to reversibly couple a leg loop assembly to a waistband of the utility belt, thereby enabling a wearer to attach or remove the leg loop assembly as desired. However, the inventors herein have identified potential issues with the approach of Kopp. In one example, as a single carabiner is used both to reversibly couple the leg loop assembly to the waistband, and as the primary attachment point of the harness, the carabiner may accommodate a reduced number of connections, as at least a portion of the carabiner is already occupied by connection to the leg loop assembly. In another example, as the carabiner is actuatable to an open configuration, there is a potential for the carabiner to inadvertently open. This may be exacerbated in rescue or tactical operations, as the operation may demand a user to rapidly couple and/or uncouple gear, rope, etc. from the carabiner, increasing a probability of inadvertent opening. In another example, the carabiner may become cross loaded when additional loads are attached thereto, which may increase wear on the carabiner.

In other approaches, a utility belt may be reversibly coupled to a leg loop assembly by opening a buckle of the utility belt, and passing a loop of the leg loop assembly, around the waistband of the utility belt, before closing the buckle of the utility belt, thereby securing the leg loop assembly to the utility belt. The inventors herein have identified potential issues with the above approach. In one example, unbuckling the utility belt in order to couple the leg loop assembly thereto may be problematic if the belt is used to hold up clothing or gear. Further, in situations where the utility belt is bearing weight, it may be impractical to disengage the buckle of the utility, thus inhibiting a user from transitioning from a utility belt to sit-harness configuration until the belt is unloaded.

The inventors herein provide systems and methods which may at least partially address the above challenges. In one example, the current disclosure describes a convertible harness system, that is quickly convertible between a utility belt, a sit-harness and a full body harness by adding and removing components in situ. The convertible harness system of the current disclosure may provide the user with an adaptable range of options to address different scenarios that may be encountered on a given mission. Further, as the configurable components are interchangeable across multiple belts and sizes, the convertible harness system disclosed herein may enable utility and functionality to be added to a team of users by providing a select member of the team the option of configuring a belt system based on the situation, while reducing the total amount/number of components carried by the team.

In another example, the current disclosure provides a convertible harness system for selective use as a utility belt, sit-harness or full body harness, wherein a leg loop assembly may be reversibly coupled to a utility belt by passing a primary attachment point of the leg loop assembly through an attachment slot/opening in the utility belt and securing the primary attachment point to the utility belt via a girth-hitched loop also attached to the leg loop assembly. The method of attachment described above enables the leg loop assembly to be rapidly, reversibly coupled to the utility belt, using a captive eye as the primary attachment point, as opposed to a carabiner or other openable device. The above method further enables a user to convert a utility belt to a sit-harness, while the user is wearing the utility belt, and without requiring the user to unbuckle the utility belt. Further, the method of attachment described above provides a connection that cannot be undone while a line is connected to the primary attachment point/captive eye, thereby mitigating the issue of unintentional uncoupling of the leg loop assembly from the utility belt, which may occur in conventional convertible harness systems. Further, in some embodiments an additional chest harness component may be added to the utility belt/leg loop combination (to form a full body harness configuration) by forming a secondary girth-hitch around the primary attachment point using a secondary attachment loop coupled to the chest harness. In some embodiments the additional chest harness component may be added to the utility belt/leg loop combination (to form a full body harness configuration) by coupling the primary attachment point to the chest harness via a reverser buckle or other mechanisms known in the art. Once the chest harness is coupled to the sit-harness, uncoupling of the leg loop assembly from the utility belt is prevented by the secondary girth-hitch, enabling the user to tie-in to a secondary attachment point on the chest harness with a substantially reduced probability of the utility belt separating from the leg loop assembly.

Figure 2:
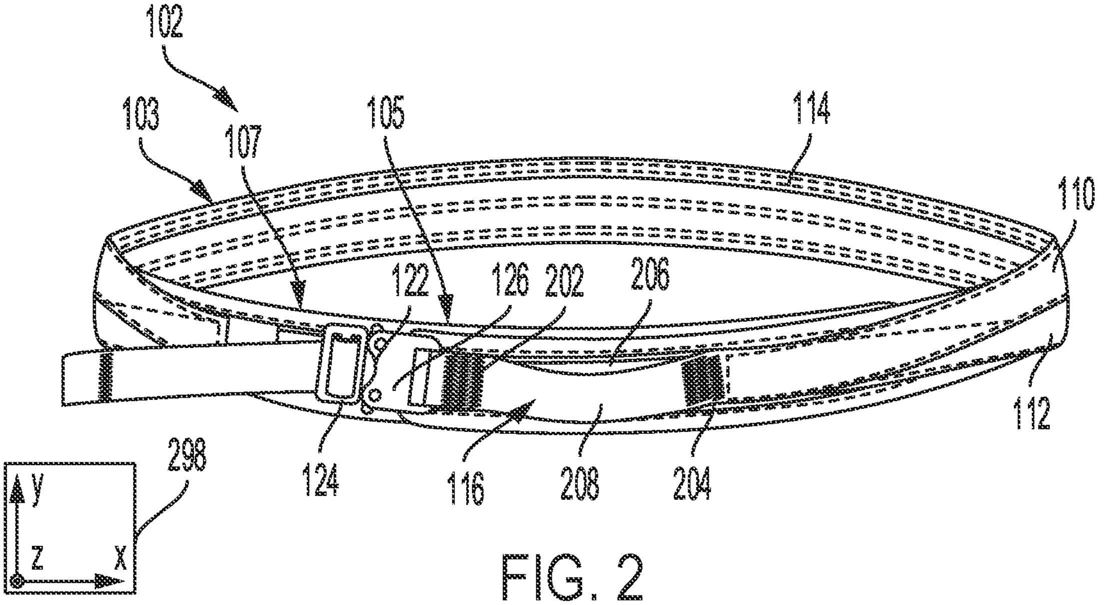
FIG. 2 shows an example of a utility belt of the convertible harness system.
Figure 3:
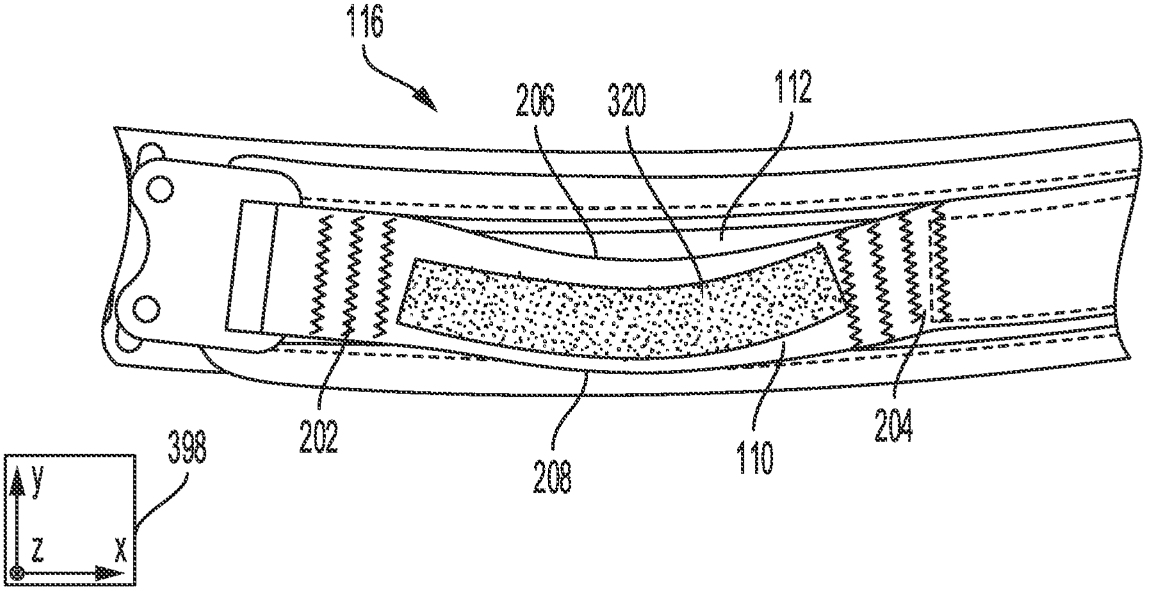
FIG. 3 shows a front portion of the utility belt of the convertible harness system.
Figure 4:
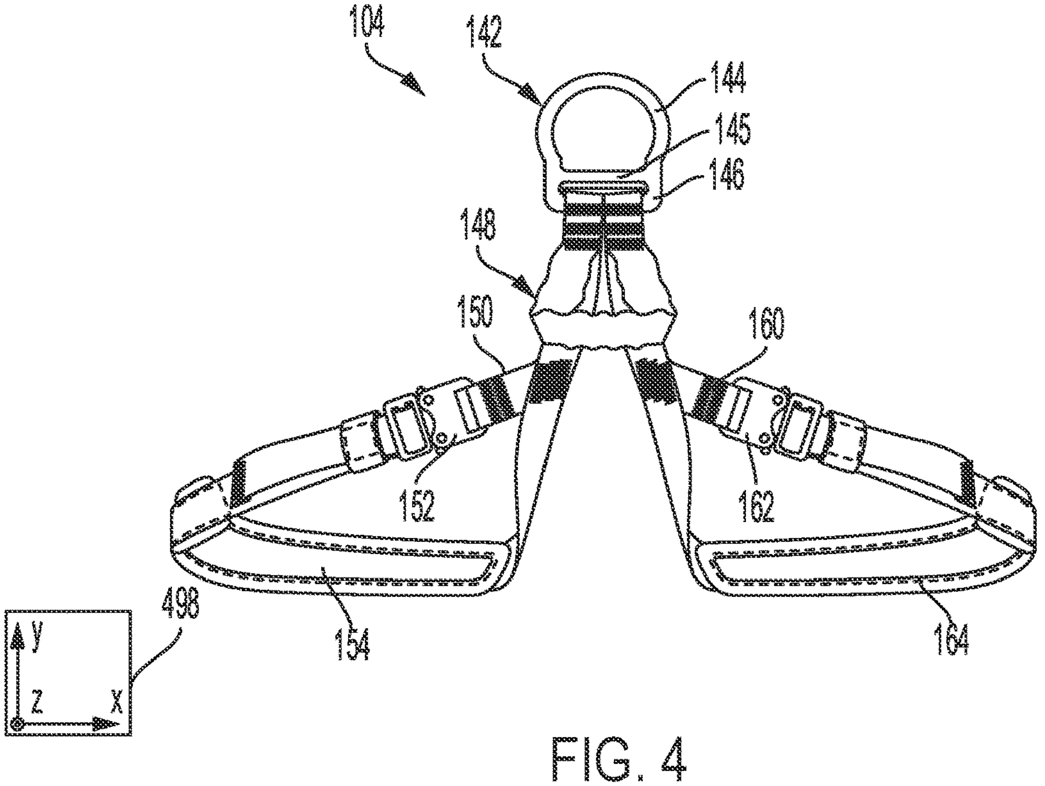
FIG. 4 shows an example of a leg loop assembly of the convertible harness system.
Figure 7C:
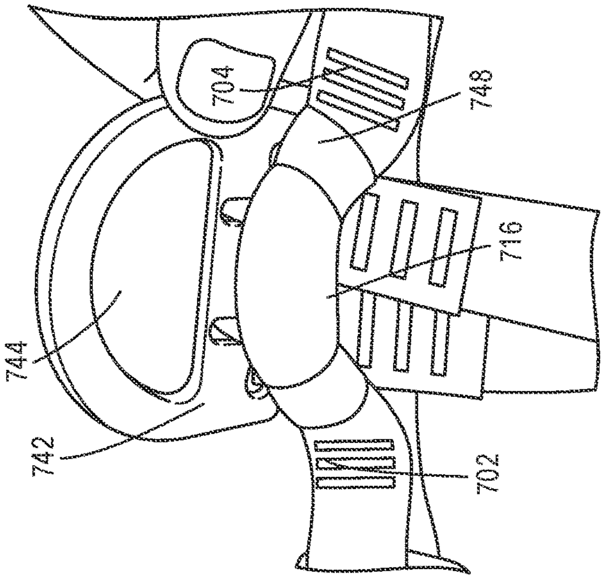
FIGS. 7A, 7B, and 7C illustrate a method of attaching the leg loop assembly to the utility belt.
Figure 7B:
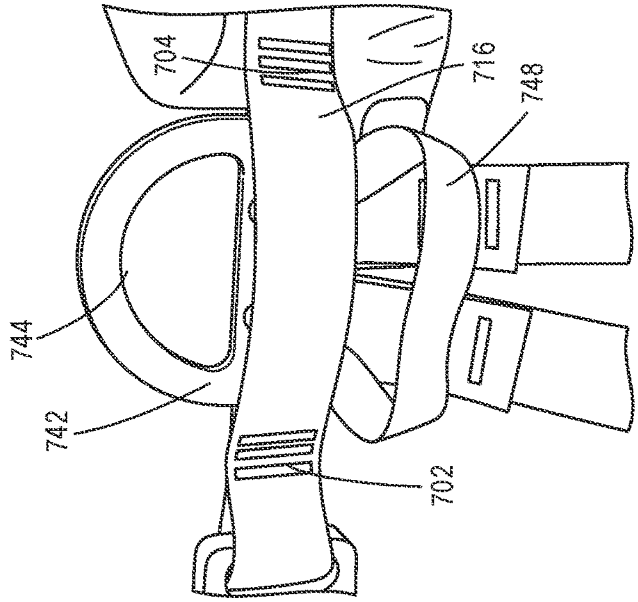
Figure 7A:
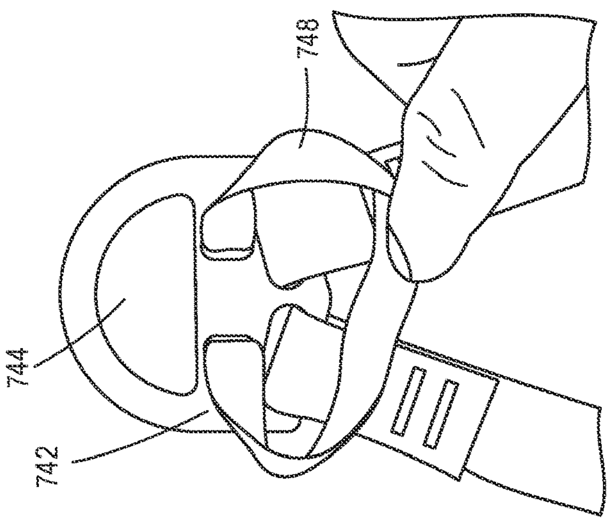
Figure 8A:
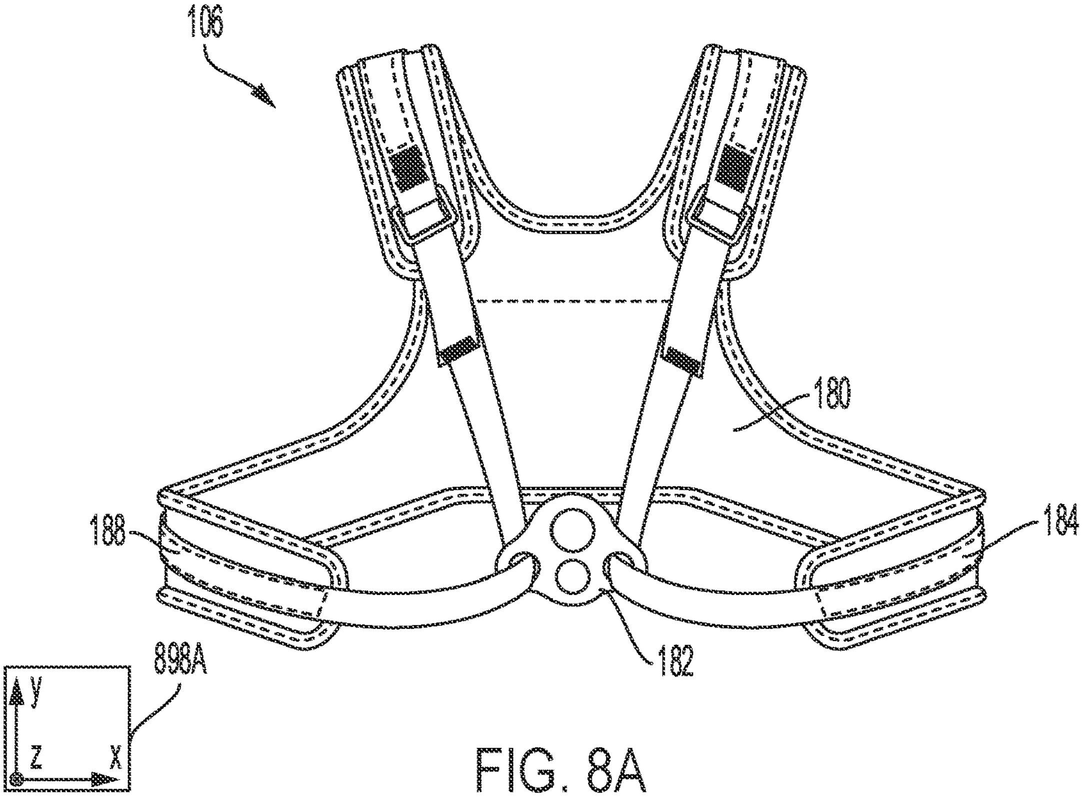
FIGS. 8A and 8B show an example of a chest harness of the convertible harness system.
Figure 8B:
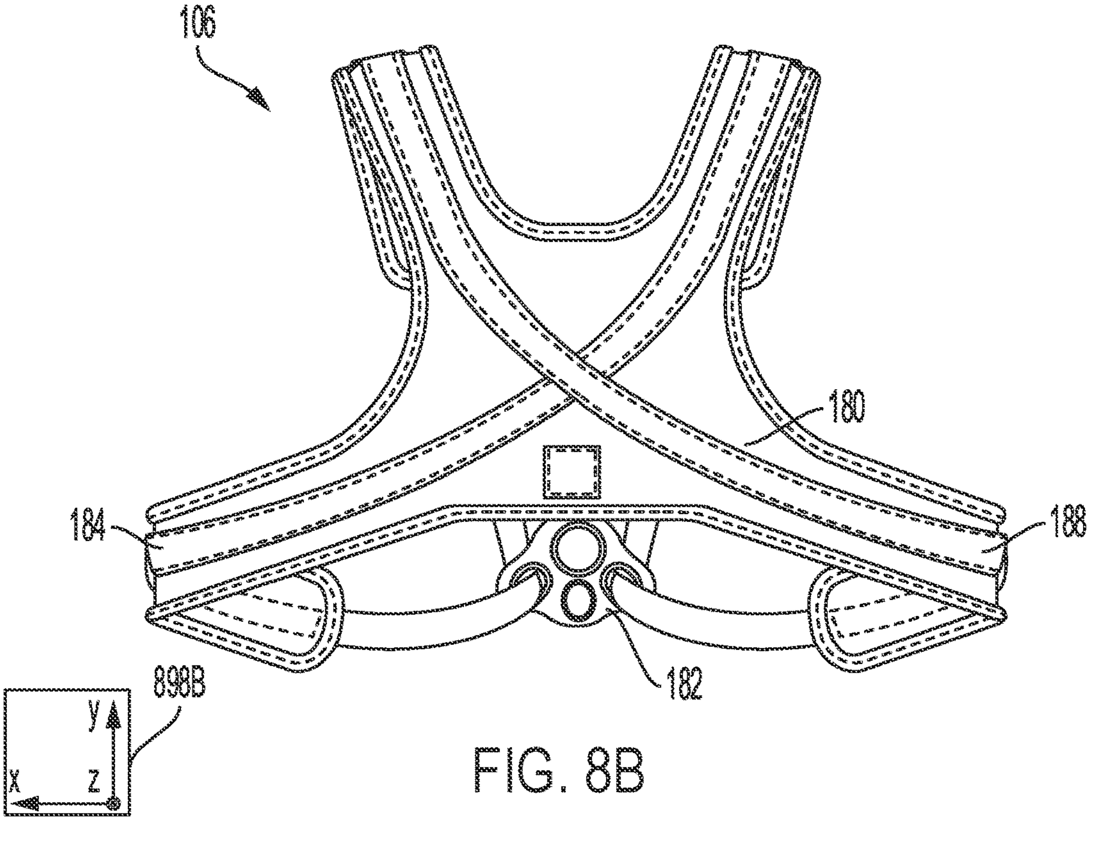

In one embodiment, convertible harness system 100, shown in FIG. 1, comprises a utility belt 102, a leg loop assembly 104 which may be reversibly coupled to the utility belt 102, and a chest harness 106, which may be reversibly coupled to the utility belt 102. The convertible harness system 100 may be selectively reconfigured between a utility belt configuration, a sit-harness configuration, and a full body harness configuration by reversibly coupling or uncoupling the leg loop assembly 104 and/or the chest harness 106, from the utility belt 102, as desired. FIG. 2 shows one embodiment of a utility belt 102 of convertible harness system 100, comprising an attachment slot 116, wherein the leg loop assembly 104 may be reversibly coupled to utility belt 102 by girth-hitching the leg loop assembly 104 to attachment slot 116 via primary attachment point 142 and primary attachment loop 144, as illustrated in FIGS. 7A, 7B, and 7C. FIG. 3 shows a front portion of the utility belt 102, wherein the front portion includes attachment slot 116. FIG. 4 shows the leg loop assembly 104 uncoupled from the utility belt 102, while FIG. 5 and FIG. 6 emphasize the primary attachment point 142, and primary attachment loop 144 of the leg loop assembly 104. FIG. 8A and FIG. 8B show a first and second perspective view of chest harness 106, respectively, which may be reversibly coupled to a sit-harness configuration of the convertible harness system 100.

FIGS. 1-8B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). Axis systems, such as axis system 190, may be included in one or more figures disclosed herein. The direction indicated by the arrow associated with an axis of the axis system may be referred to herein as the positive direction of that axis, while the direction opposite the direction indicated by the arrow of an axis is referred to as being in the negative direction of that axis. For example, the x-axis of axis system 198 points to the right (as viewed face on), and as such, movement in the rightward direction may be referred to as movement in the positive-x-direction, while contrastingly, movement in the leftward direction may be herein referred to as movement in the negative-x-direction. The same convention is used herein with regards to the y-axis, and the z-axis.

Turning to FIG. 1, an example of a convertible harness system 100 is shown in a full body harness configuration. The convertible harness system 100 may be employed by rescue workers, rope access workers, rock climbers, soldiers, radio tower repair workers, etc. to attach themselves to a rope, anchor, tower, zip line, another person, or to pieces of equipment or gear. The convertible harness system 100 comprises a utility belt 102, a leg loop assembly 104 reversibly coupled to the utility belt 102, and a chest harness 106 reversibly coupled to the leg loop assembly 104. The convertible harness system 100 may be selectively reconfigured from the full body harness configuration (shown in FIG. 1) to a sit-harness configuration by uncoupling the chest harness 106 from the leg loop assembly 104. Likewise, the full body harness configuration may be selectively reconfigured to a utility belt configuration by uncoupling the chest harness 106 from the leg loop assembly 104, and subsequently uncoupling the leg loop assembly 104 from the utility belt 102. Convertible harness system 100 allows a user to quickly adapt to a particular operation or task, by enabling the user to efficiently reconfigure the convertible harness system 100 to a utility belt a, sit-harness, or a full body harness, on the fly. In one example, a user may wear utility belt 102, which may hold gear, weapons, etc., while moving laterally along a terrain. Upon encountering a vertical drop in the terrain, into which the user wishes to descend, the user may attach leg loop assembly 104 to utility belt 102, thus putting the convertible harness system 100 into a sit-harness configuration. Said attachment of the leg loop assembly 104 with the utility belt 102 may occur while the user is wearing utility belt 102, thus saving time and bypassing the need to remove or adjust gear or weapons attached to utility belt 102. With the convertible harness system 100 in a sit-harness configuration, the user may now couple the convertible harness system 100 to a rope or rappelling device, and rappel the vertical drop in a conventional manner.

Convertible harness system 100 is shown next to an axis system 198, comprising three axes, namely an x-axis parallel to a horizontal direction, a y-axis parallel to a vertical direction, and a z-axis perpendicular to each of the horizontal and vertical directions is shown. As the z-axis extends into the plane of FIG. 1, it is shown as a black dot within a white circle at the point of intersection between the x-axis and the y-axis.

The utility belt 102 comprises a waistband 103 which comprises an elongate material having a first end 105 and a second end 107 positioned opposite first end 105. In the embodiment shown in FIG. 1, waistband 103 includes a first webbing 110 and a second webbing 112. In some embodiments, first webbing 110 and second webbing 112 comprise a single, folded length of webbing, or a single ring of webbing, wherein the first webbing comprises a first portion of the single folded length of webbing, and wherein the second webbing 112 comprises a second portion of the single folded length of the webbing, wherein the first portion and the second portion are divided by a fold in the single folded length of webbing. The first webbing 110 and the second webbing 112 may overlap (with respect to the y-axis of axis system 198) along a front portion of utility belt 102, proximal to buckle 122. In one example, a degree of overlap between the first webbing 110 and the second webbing 112 is in the range of 50% to 100%, or any fractional amount therebetween. Within the front portion of waistband 103, the first webbing 110 and the second webbing 112 may be coupled together at a first position and a second position spaced apart from the first position, and between the first position and second position, the first webbing 110 may not be coupled to the second webbing 112, thereby forming attachment slot 116, comprising a passage through waistband 103. In some embodiments, first webbing 110 and second webbing 112 may be coupled together at the first location and the second location by a plurality of stitches. In some embodiments, the plurality of stitches may comprise a bartack stitch pattern, or other high-strength stitch pattern known in the art. A width of the attachment slot 116, may be greater than a width of a primary attachment point 142, thereby enabling primary attachment point 142 to be inserted into, and pass through, attachment slot 116.

First end 105 of waistband 103 is coupled to a female half 126 of buckle 122, and second end 107 is coupled to male half 124 of buckle 122. In some examples, buckle 122 comprises a stab buckle, and closure of waistband 103 may comprise inserting male half 124 into female half 126. Buckle 122 comprises quick release tabs positioned on opposite sides of buckle 122, enabling a user to unfasten buckle 122 with a single hand, by, for example, using a thumb and index finger. Buckle 122 enables a user to easily don or remove utility belt 102 by uncoupling first end 105 from second end 107, wrapping waistband 103 around a waist of the user, and re-coupling first end 105 with second end 107 via buckle 122. Buckle 122 may include a strap length adjustment device, wherein one or more of first webbing 110 and second webbing 112 may pass therethrough, enabling a user to adjust a circumference of waistband 103.

Utility belt 102 further comprises belt padding 114, which lines an inner circumference of waistband 103. In some embodiments, belt padding 114 comprises synthetic foam. Belt padding 114 is configured to distribute pressure of the waistband 103 to a greater area of a wearer, thus increasing comfort of the wearer. In some embodiments, belt padding 114 may run an entire length of waistband 103. In some embodiments, belt padding 114 may run along a fraction of an entire length of waistband 103. Belt padding 114 may be coupled to first webbing 110 and second webbing 112, at a plurality of locations, thereby inhibiting first webbing 110 and second webbing 112 from sliding up or down a waist of a wearer relative to belt padding 114. In some embodiments, belt padding 114 may be coupled to first webbing 110 and/or second webbing 112 via a plurality of stitches. Relative positioning of first webbing 110 and second webbing 112 may be accomplished by coupling first webbing 110 and second webbing 112 to belt padding 114, as belt padding 114 comprises a substantially rigid backing for both first webbing 110 and second webbing. In the embodiment shown in FIG. 1, first webbing 110 and second webbing 112, overlap along a front portion of waistband 103, but diverge (with respect to the y-axis) along the side and back portions waistband 103, thereby occupying a larger y-axial extent, and thus distributing pressure more evenly on the waist of a wearer. In some embodiments, first webbing 110 and second webbing 112 diverge to cover an entire height (y-axial extent) of belt padding 114. In some embodiments, a degree of overlap between the first webbing 110 and second webbing 112 may be zero. In some embodiments, the divergence of the webbing may be based on the belt height, such that the first and second webbing extent along substantially the entire height of the belt.

The leg loop assembly 104 comprises a right leg loop 150, and a left leg loop 160, which are configured to wrap around the legs of a user, providing additional contact points between a body of a user and convertible harness system 100. In some embodiments, right leg loop 150 and left leg loop 160 comprise webbing. In some embodiments, right leg loop 150 and left leg loop 160, comprise a single, closed loop of webbing. Right leg loop padding 154 is affixed to a portion of an inner circumference of right leg loop 150, providing additional comfort and stability to a user. Likewise, left leg loop padding 164 is affixed to a portion of an inner circumference of left leg loop 160. Right leg loop 150 further comprises a right leg loop buckle 152, configured to open or close the right leg loop 150. Likewise, left leg loop 160 comprises a left leg loop buckle 162, configured to open or close the left leg loop 160. Right leg loop buckle 152 and left leg loop buckle 162 enable the legs of a user be enclosed by right leg loop 150 and left leg loop 160, without the need for the user to step into right leg loop 150 and left leg loop 160, thereby facilitating easier attachment/removal of leg loop assembly 104. Although the right leg loop 150 and left leg loop 160 are shown herein as including buckles, it will be appreciated that the current disclosure provides for leg loop assemblies with or without leg loop buckles.

Leg loop assembly 104 further comprises a primary attachment point 142, coupled to both the right leg loop 150 and left leg loop 160, and further coupled to an attachment loop 148. In some embodiments, the primary attachment point 142 may formed by a rigid material such as aluminum. In some embodiments, the primary attachment point 142 may be formed by a textile loop. In some embodiments, the right leg loop 150, the left leg loop 160, and the attachment loop 148, may comprise a continuous length of webbing or other elongate material having a high tensile strength. Primary attachment point 142 comprises a primary eye 144, and a secondary eye 146, wherein the primary eye 144 and the secondary eye 146 are separated by a bar 145. Primary eye 144 may comprise a rounded or oblong passage, having a first diameter, through primary attachment point 142, to which a user may attach carabiners, or other gear. Primary eye 144 does not comprise a gate, or other openable elements, and therefore has a reduced probability of inadvertent opening. Secondary eye 146 comprises a rounded or oblong passage through primary attachment point 142, having a second diameter, to which the right leg loop 150, the left leg loop 160, and the attachment loop 148, may be affixed. In some embodiments, one or more of the right leg loop 150, the left leg loop 160, and the attachment loop 148, may pass through secondary eye 146, and may affixed thereto via knot or stitching, thus leaving primary eye 144 free to receive connections with objects external to convertible harness system 100, such as rope, carabiners, rappelling devices, etc.

As shown in FIG. 1, utility belt 102 and leg loop assembly 104 are reversibly coupled by a girth-hitch between attachment slot 116 and primary attachment point 142 formed using attachment loop 148. In the coupled configuration shown in FIG. 1, the primary attachment point 142 passes up (in the positive-y-direction) into attachment slot 116, until at least primary eye 144 passes through, and extends out from a top opening of attachment slot 116. The girth-hitch is formed by attachment loop 148, which extends downwards (in the negative-y-direction) from secondary eye 146, out of attachment slot 116, passes in front of first webbing 110 (in the negative-z-direction, relative to first webbing 110), and then passes over and around the portion of primary attachment point 142 extending out of attachment slot 116. In some embodiments, the primary attachment point 142 comprises a wider portion and a narrower portion, wherein the wider portion corresponds to a location of the primary eye 144, and wherein the narrower portion (also referred to herein as a neck) corresponds to the bar 145 and/or the secondary eye 146. A width (an extent along the x-axis of axis system 198) of the wider portion may be substantially greater than a width of the narrower portion. Further, a width of the attachment slot 116 may be selected based on the width of the wider portion, such that the attachment slot is of equal or greater width than the width of the wider portion. The attachment loop 148 may therefore be looped over the wider portion of the primary attachment point 142, and around the narrower portion (the neck). In this arrangement, the wider portion inhibits the attachment loop 148 from coming off the primary attachment point 142 and undoing the girth-hitch. Further, it will be recognized that when the primary attachment point 142 is attached to an external object (via the primary eye 144), such as a rope or piece of equipment, the leg loop assembly 104 is prevented from uncoupling from the utility belt by said external object, as the external object blocks the attachment loop 148 from passing over the primary attachment point 142. Likewise, coupling of the chest harness 106 to the primary attachment point 142 inhibits uncoupling of the utility belt 102 from the leg loop assembly 104, by inhibiting the attachment loop 148 from passing over and off of primary attachment point 142.

Convertible harness system 100 further comprises chest harness 106. Chest harness 106 may be reversibly coupled to primary attachment point via a second girth-hitch, formed using a chest harness attachment loop 194 coupled to a chest harness buckle 192. In one example, to attach the chest harness 106 to the utility belt 102, a user may don the harness by pulling it over the head and passing the arms through, centering the secondary attachment point along the sternum of the user. The chest harness attachment loop 194, which may initially be uncoupled from the chest harness, may comprise a closed eye. The user may attach the chest harness attachment loop 194 to the primary attachment point 142 by passing the eye-end of the chest harness attachment loop 194 through either the primary eye 144 (or the secondary eye 146), around bar 145, and up through the secondary eye 146 (or the primary eye 144), and then passing the end of the chest harness attachment loop 194 opposite the eye-end through the eye of the chest harness attachment loop 194, forming a girth hitch around the bar 145 of the primary attachment point 142. The end of the chest harness attachment loop 194 opposite the eye-end may then be passed through the chest harness attachment point 182, and fed through chest harness buckle 192, thereby coupling the chest harness 106 with the utility belt 102.

Turning to FIG. 2, utility belt 102 is shown uncoupled from leg loop assembly 104 and chest harness 106. Utility belt 102 comprises waistband 103, which includes first webbing 110 and second webbing 112. Coupled to an interior circumference of first webbing 110 and second webbing 112 is belt padding 114. Waistband 103 terminates at a first end 105, and a second end 107 positioned opposite the first end 105. First end 105 is coupled to a female end 126 of buckle 122, and second end 107 is coupled to male end 124 of buckle 122. The first end 105 and second end 107 may be reversibly coupled or uncoupled via buckle 122, e.g., by connecting the male end 124 and the female end 126 of buckle 122 the first end 105 may be securely connected to second end 107. Male end 124 comprises a slip-lock strap length adjuster, through which a portion of the first webbing 110 and/or a portion of the second webbing 112 may pass. In one example, a user may adjust a circumference of waistband 103 (e.g., to adjust a size of waistband 103 to fit snuggly against the waist of the user) by pulling first webbing 110 and/or second webbing 112 through the slip-lock strap length adjuster of buckle 122. Female end 126, may comprise a passage or slot through which first webbing 110 and/or second webbing 112 may pass, thereby coupling female end 126 to first end 105 via a closed loop formed by one or more of first webbing 110 and./or second webbing 112. In one example, first webbing 110 and second webbing 112 may comprise a single continuous piece of webbing folded/doubled up, wherein the single piece of continuous webbing may pass through an attachment loop in female end 126, thereby coupling female end 126 with belt buckle 122.

FIG. 2 more clearly shows attachment slot 116, which comprises a gap/passage between first webbing 110 and second webbing 112. Attachment slot 116 extends from a first location 202 to a second location 204, wherein the first location 202 and second location 204 comprise points of attachment between first webbing 110, second webbing 112, and padding 114. Between first location 202 and second location 204, the first webbing 110 is not coupled to either the second webbing 112 or padding 114, however second webbing 112 may be coupled to padding 114 between first location 202 and second location 204. A width (a length of extension along the x-axis of axis system 298) of attachment slot 116 is determined by the spacing between the first location 202 and the second location 204. In one example, the spacing between the first location 202 and the second location 204 may be greater than a greatest width of primary attachment point 142, thereby enabling primary attachment point 142 to pass therethrough. Attachment slot 116 comprises a first opening 208, which opens towards a bottom (negative y-direction of axis system 298) of waistband 103. Positioned opposite first opening 208 is second opening 206, wherein second opening 206 opens to a top (positive y-direction of axis system 298) of waistband 103. When reversibly connecting utility belt 102 with leg loop assembly 104, the primary attachment point passes up through first opening 208, and out of second opening 206.

Turning to FIG. 3, an enlarged view of a front portion of utility belt 102 is shown. FIG. 3 more clearly shows features of attachment slot 116. As shown in FIG. 3, first location 202 comprises a plurality of stitches coupling first webbing 110, second webbing 112, and padding 114. The plurality of stitches at first location 202 are in a bartack stitch pattern, however it will be appreciated that other stitch patterns known in the art may be used without departing from the scope of the disclosure. Similarly, at second location 204, the first webbing 110, second webbing 112, and padding 114, are coupled together via a plurality of stitches in a bartack pattern. First webbing 110 and second webbing 112 run parallel from at least the first location 202 to the second location 204, substantially parallel to the x-axis of the axis system 398. The portion of first webbing 110 between the first location 202 and the second location 204 may be of tubular conformation, such that a rigid insert 320 may pass within a cavity of the webbing 110 thereby biasing first webbing 110 away from second webbing 112 between the first location 202 and the second location 204, thereby facilitating insertion/removal of the primary attachment point 142 and preventing the girth hitch from tightening excessively under load, facilitating easier its release. In some embodiments, the rigid insert 320 may comprise a length of vinyl tubing, or other polymer. In some embodiments, the rigid insert 320 may comprise an elastic or partially elastic material. The rigid insert 320 may be of an elongate, curved shape, thereby imparting a curved shape to first webbing 110 between first locations 202 and second location 204. In some embodiments, rigid insert 320 may be inserted into a cavity of first webbing 110, prior to stitching at the first location 202 and the second location 204. As webbing comprises an inner cavity or gap (thus the name tubular), the diameter of the rigid insert 320 may be sized such that an outer diameter of the rigid insert 320 is equal to or less than an inner diameter of the cavity of first webbing 110.

Turning to FIG. 4, leg loop assembly 104 is shown uncoupled from utility belt 102 and chest harness 106. FIG.

4 shows the primary attachment point 142 disengaged from attachment slot 116. Primary attachment point 142 comprises the primary eye 144, the secondary eye 146, and the bar 145 separating the primary eye 144 and the secondary eye 146. The primary eye 144 comprises an oblong passage through primary attachment point 142, configured to receive one or more connections to gear, rope, anchors, other harnesses, etc. In one example, a carabiner may clip into primary eye 144. In some embodiments, the primary eye comprises a substantially D shaped passage through primary attachment point 142. In some embodiments, primary attachment point 142 comprises a D-ring. Primary attachment point 142 may be made of metal, textile, or other materials having high tensile strength.

Secondary eye 146, similar to primary eye 144, comprises a rounded or oblong passage through primary attachment point 142. As secondary eye 146 is not configured to connect to external gear, harnesses, anchors, etc., a size of secondary eye 146 may be smaller than a size of primary eye 144. In some embodiments, a height (an extent along the y-axis of axis system 498) of secondary eye 146 may be a threshold distance larger than a thickness of webbing used to construct the attachment loop 148, wherein the threshold is not more than twice the thickness of the webbing. In some embodiments, a height (an extent along the y-axis of axis system 498) of secondary eye 146 may be a threshold distance larger than a thickness of a webbing connector. Further, primary attachment point 142 may have a first width (extent along the x-axis of axis system 498) in the region of primary attachment point surrounding primary eye 144, and a second width (extent along the x-axis of axis system 498) in the region of primary attachment point 142 surrounding secondary eye 146, wherein the first width may be greater than the second width, and wherein the region of primary attachment point 142 having the second width may be referred to as a neck of primary attachment point 142.

In contrast with conventional harness systems, primary attachment point 142 includes no moving parts, and is non-openable (that is, the primary eye 144 and secondary eye 146 comprise closed rings, devoid of a gate or other opening mechanism such as may be found in carabiners or other openable devices). A technical effect of providing a convertible harness system with a primary attachment point devoid of moving parts, is that a probability of inadvertent opening of the primary attachment point is reduced compared to conventional approaches which employ carabiners.

In the embodiment of leg loop assembly 104 shown in FIG. 4, right leg loop 150, left leg loop 160, and attachment loop 148, are formed by a single, continuous length of webbing, wherein coupling between the right leg loop 150, left leg loop 160, and attachment loop 148, with primary attachment point 142, is achieved by passing attachment loop 148 through secondary eye 146, and stitching or otherwise affixing a first portion of attachment loop 148 to a second portion of attachment loop 148. A technical effect of using a single continuous length of webbing to provide both leg loops and an attachment loop of a leg loop assembly is that a number of stitches may be reduced thereby increasing a strength of the leg loop assembly, as points of coupling between distinct pieces of webbing may have an increased probability of failure compared to a continuous length of webbing. Further, a folded construction adds redundancy to the leg loop assembly, inhibiting a user from being unintentionally released from a harness.

Leg loop assembly 104 further comprises the right leg loop 150, and the left leg loop 160, which may be configured to hold the right and left leg of a user, respectively. A user may equip the leg loop assembly 104 by unfastening right leg loop buckle 152, unfastening left leg loop buckle 162, wrapping the unfastened right leg loop 150 about a right leg of the user, wrapping the unfastened left leg loop 160 about a left leg of the user, and fastening both the right leg loop buckle 152 and the left leg loop buckle 162, thereby enclosing the right and left legs of the user in the right and left leg loops, respectively.

Right leg loop 150 includes right leg loop padding 154, and symmetrically, left leg loop 160 comprises left leg loop padding 164. Right leg loop padding 154 may be stitched or otherwise affixed to an inner circumference of right leg loop 150, and left leg loop padding 164 may be stitched or otherwise affixed to an inner circumference of left leg loop 160. Right leg loop padding 154 and left leg loop padding 164, are configured to line a portion of the right leg loop 150 and left leg loop 160 which may exert force on the user, while the user hangs from the leg loop assembly 104.

Figure 5:
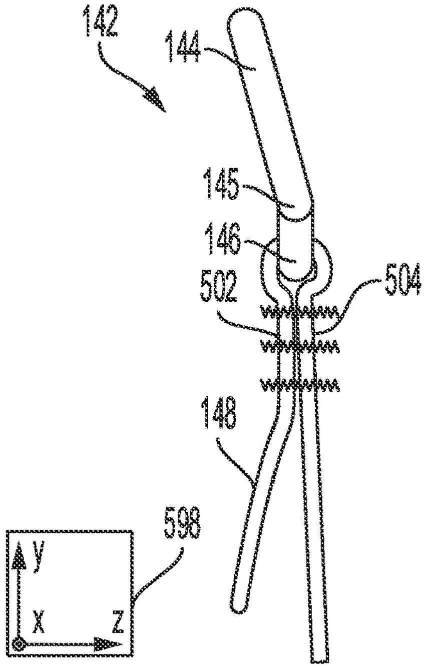
FIGS. 5 and 6 show an example of a primary attachment point and attachment loop of the leg loop assembly of the convertible harness system.
Figure 6:
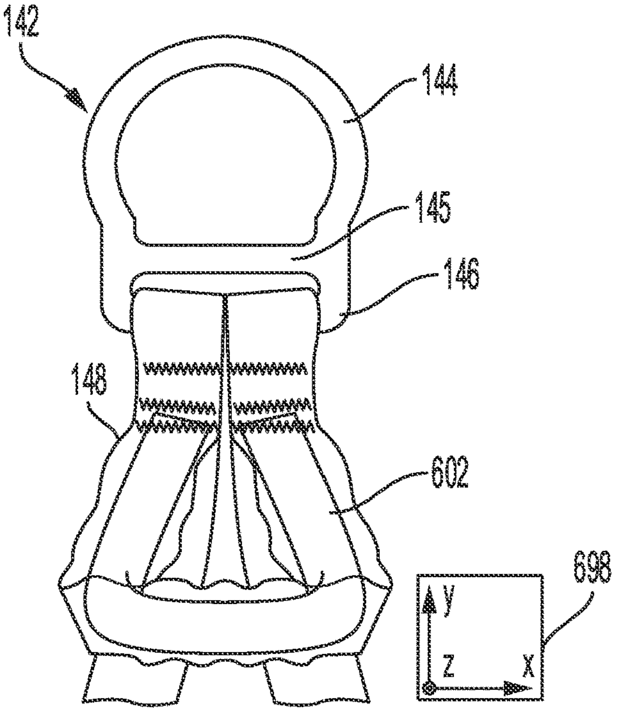

Turning to FIGS. 5 and 6, enlarged views of primary attachment point 142 are shown. In FIG. 5, a profile view of primary attachment point 142 is shown. As viewed in profile, an angle change between the region of primary eye 144 and secondary eye 146 can be seen. This angle change occurs along a central axis of bar 145 in the embodiment shown in FIG. 5, however it will be appreciated that the angle change may occur at positions further along the y-axis, or closer to the origin of the y-axis, of axis system 598. The angle of extent of primary attachment point 142 in the region of secondary attachment eye 146, is substantially parallel to the y-axis of axis system 598. However, at bar 145, the angle of extent of primary attachment point 142 deflects in the negative-z-direction (that is, away from the body of a wearer, were the leg loop assembly 104 equipped). In some examples, the angle change may occur along a line (parallel to the x-axis of axis system 598) dividing a portion of primary attachment point 142 having the first width, and a region of primary attachment point having the second, smaller width. Said another way, where the neck of the primary attachment point 142 meets the primary eye 144, an angle of extent of the primary attachment point may change by a pre-determined extent. In some embodiments, the angle change may be between 20 degrees and 50 degrees. The angle change discussed above enables easier attachment/removal of gear to/from the primary eye 144, because when a user has equipped the leg loop assembly 104, the primary eye 144 is deflected away from the body of a wearer by said angle change. Further, while the leg loop assembly 104 is girth-hitched to the utility belt 102, the angle change further inhibits the attachment loop 148 from sliding over the primary eye 144 and off the primary attachment point 142, thus reducing a probability of inadvertent uncoupling of the leg loop assembly 104 from the utility belt 102.

FIG. 5 illustrates one example of how the right leg loop 150, left leg loop 160, and attachment loop 148, may be coupled to primary attachment point 142. As shown in FIG. 5, both the right leg loop 150 and left leg loop 160 are continuous with the attachment loop 148. The attachment loop 148 passes through the secondary eye 146, and bends/folds back on itself, such that a first portion 502 of attachment loop 148 comes into contact with a second portion 504 of attachment loop 148. The first portion 502 of attachment loop 148 and the second portion 504 of attachment loop 148 may be joined via stitching or other means, at the position at which the first portion 502 and second portion 504 come into contact. Stitches coupling the first portion 502 and the second portion 504 are illustrated in FIG. 5 by three rows of waving lines intersecting the first portion 502 and the second portion 504.

Turning to FIG. 6, a face-on view of primary attachment point 142 is shown. FIG. 6 more clearly illustrates the features of primary attachment point 142 and attachment loop 148. Attachment loop 148 comprises a bight of webbing, which in some embodiments may comprise webbing forming right leg loop 150 and left leg loop 160. The bight of webbing is passes up, through secondary eye 146, before folding back, such that a first portion of the bight of webbing is in contact with a second portion of the bight of webbing. The first and second portions of webbing are stitched together, or otherwise coupled, forming a closed loop around secondary eye 146. In this way, primary attachment point 142 may pivot relative to primary attachment loop 148. Secondary eye 146 may have a flattened shape along a bottom side (along a side facing the negative y-direction of axis system 698), thereby facilitating smooth, low friction pivoting of primary attachment point 142 relative to its connection point with attachment loop 148.

In the embodiment shown in FIG. 6, attachment loop 148 comprises an elastic insert 602. Elastic insert 602 may be positioned within a cavity of the webbing of attachment loop 148. In some embodiments, attachment loop 148 comprises a bight of webbing, and elastic insert 602 may be positioned within a cavity of the webbing. Elastic insert 602 may comprise one or more elastically deformable materials, such as nylon. Elastic insert 602 enables attachment loop 148 to stretch and expand, thus enabling a user to more easily pass attachment loop 148 over primary attachment point 142. Elastic insert 602 may be configured to exert a force against a neck of primary attachment point 142, while in a girth-hitch conformation, thus reducing a probability of the attachment loop passing up, over, and off, of primary attachment point 142. In some embodiments, a rest length of elastic insert 602 may be less than a circumference of a neck of primary attachment point 142.

Turning to FIGS. 7A, 7B, and 7C, a method of reversibly coupling a leg loop assembly with a utility belt is shown. FIG. 7A illustrates a second embodiment of a primary attachment point 742, comprising a primary eye 744, an attachment loop 748. In FIG. 7A, the primary attachment point 742 is disengaged from a utility belt.

In FIG. 7B, the primary attachment point 742 has been passed into and through attachment slot 716 of a utility belt, such that primary eye 744 extends out of a top opening of attachment slot 716, whereas attachment loop 748 extends out of a bottom opening of attachment slot 716. Attachment slot 716 comprises a first/outer length of webbing, and a second/inner length of webbing, wherein the first length and the second length are coupled together at a first location 702, and a second location 704, via a plurality of stitches. First location 702 and second location 704 are spaced apart by a distance equal to or greater than a greatest width of primary attachment point 742, thus enabling primary attachment point 742 to pass through attachment slot 716.

In FIG. 7C, the attachment loop 748 passes in front of primary attachment slot 716, over top of primary attachment point 742, and around a neck of primary attachment point 742. Thus, FIG. 7C illustrates a girth-hitched conformation of attachment loop 748 with attachment slot 716. The method of reversibly coupling primary attachment point 742 with attachment slot 716 does not require the user to unbuckle or otherwise remove a utility belt, and therefore enables a quick and efficient method for coupling of a pair of leg loops to a utility belt.

Referring to FIG. 8A, a front view of a chest harness 106 of convertible harness system 100 is shown. FIG. 8A includes axis system 898A, shown to facilitate the description of FIG. 8A by providing a reference frame for directions and extents described in connection with FIG. 8A. Chest harness 106 comprises first chest harness strap 184, second chest harness strap 188, a chest harness attachment point 182, and chest harness padding 180. The first chest harness strap 184 and the second chest harness strap 188 pass through the chest harness attachment point 182. Chest harness padding 180 is coupled to an inner side (a side facing a user while the chest harness 106 is worn) of first chest harness strap 184 and second chest harness strap 188, such that while equipped, pressure exerted by the first chest harness strap 184 and the second chest harness strap 188 is distributed by the chest harness padding 180, to the body of the wearer. The first chest harness strap 184 and the second chest harness strap 188 form a pair of arm loops, through which a user's right and left arms may pass through while worn. The chest harness attachment point, similar to primary attachment point 142, may comprise a rigid, non-openable structure, wherein one or more holes/eyes pass therethrough. The holes/eyes of chest harness attachment point 182 may receive first chest harness strap 184, second chest harness strap 188, and may further enable a user to attach gear such as carabiners, ropes etc. to chest harness attachment point 182. The chest harness attachment point 182 may be coupled to a chest harness riser, wherein the chest harness riser may reversibly engage with primary attachment point 142, thereby connecting chest harness 106 with leg loop assembly 104 and utility belt 102. In one embodiment, the chest harness riser may girth-hitch the bar 145 of primary attachment point 142.

Turning to FIG. 8B, a back view of chest harness 106 is shown. FIG. 8A includes axis system 898B, shown to facilitate the description of FIG. 8B by providing a reference frame for directions and extents described in connection with FIG. 8B. FIG. 8B shows first chest strap 184 and second chest strap 188 cross behind chest harness padding 180. Thus, while equipped by a user, first chest harness strap 184 passes under a left arm of the user, across a back of the user outside of chest harness padding 180, and over a right shoulder of the user. Similarly, second chest harness strap 188 passes under the right arm of a user, across a back of the user, outside of chest harness padding 180, and over a left shoulder of the user.

The invention claimed is:

1. A harness system, comprising:
- a utility belt; and
- a leg loop assembly reversibly coupled to the utility belt, the leg loop assembly comprising:
  - a right leg loop;
  - a left leg loop;
  - an attachment loop; and
  - a primary attachment point, wherein the right leg loop, the left leg loop, and the attachment loop, are coupled to the primary attachment point, and wherein the leg loop assembly is reversibly coupled to the utility belt by girth-hitching the primary attachment point to the utility belt using the attachment loop.

2. The harness system of claim 1, wherein the utility belt includes:
- a waistband comprising a first webbing and a second webbing, wherein the first webbing and the second webbing overlap at least along a front portion of the waistband; and an attachment slot comprising a passage between the first webbing and the second webbing in the front portion of the waistband.

3. The harness system of claim 2, wherein girth-hitching the primary attachment point to the utility belt using the attachment loop comprises:

inserting the primary attachment point through the attachment slot; and girth-hitching the primary attachment point to the waistband via the attachment loop.

4. The harness system of claim 3, wherein girth-hitching the primary attachment point to the waistband via the attachment loop comprises:

passing the attachment loop out of a first opening of the attachment slot, wherein the primary attachment point extends out of a second opening of the attachment slot;

passing the attachment loop in front of the front portion of the waistband; and wrapping the attachment loop over and around the primary attachment point.

5. The harness system of claim 1, wherein the primary attachment point consists of a continuous piece of rigid or textile material having at least a first passage therethrough.

6. The harness system of claim 1, wherein the attachment loop comprises an elastic insert.

7. The harness system of claim 1, wherein the girth-hitching includes the attachment loop being positioned around both the primary attachment point and the utility belt.

8. The harness system of claim 1, wherein a primary eye of the primary attachment point is exposed via the girth-hitching without the attachment loop entering through the primary eye.

9. The harness system of claim 1, wherein the attachment loop is positioned at a juncture of the right leg loop and the left leg loop.

10. The harness system of claim 9, wherein the attachment loop is positioned between the juncture of the right leg loop and the left leg loop, and a base of the primary attachment point.

11. A harness system, comprising:

a utility belt, the utility belt including:

a waistband;

a first end;

a second end, positioned opposite the first end;

an attachment slot, positioned proximal to the first end, wherein the attachment slot comprises a first opening, and a second opening positioned opposite the first opening, wherein the attachment slot is configured to receive a primary attachment point; and a buckle, wherein the buckle is configured to reversibly couple the first end and the second end of the utility belt; and a leg loop assembly reversibly coupled to the utility belt, the leg loop assembly comprising:

a right leg loop;

a left leg loop;

an attachment loop; and the primary attachment point, wherein the right leg loop, the left leg loop, and the attachment loop, are coupled to the primary attachment point;

wherein the leg loop assembly is reversibly coupled to the utility belt by girth-hitching the primary attachment point to the utility belt using the attachment loop; and wherein, while the leg loop assembly is reversibly coupled to the utility belt, the primary attachment point passes through the attachment slot and extends out of the second opening, and the attachment loop extends out of the first opening and passes around the attachment slot and around the primary attachment point.

12. The harness system of claim 11, wherein the waistband comprises a first webbing and a second webbing, wherein the first webbing and the second webbing overlap along a first portion of the waistband, and wherein the first webbing and the second webbing do not overlap along a second portion of the waistband.

13. The harness system of claim 12, wherein the first portion of the waistband comprises the attachment slot, and wherein the attachment slot comprises an outer length of the first webbing and an inner length of the second webbing, wherein the outer length and the inner length are coupled together at a first location and a second location spaced apart from the first location, and wherein the outer length and the inner length are not coupled together between the first location and the second location.

14. The harness system of claim 13, wherein the attachment slot comprises a rigid insert within a cavity of the outer length of the first webbing.

15. The harness system of claim 14, wherein the rigid insert biases the outer length of the first webbing away from the inner length of the second webbing, forming a gap between the outer length and the inner length.

16. The harness system of claim 11, wherein the primary attachment point comprises a D-ring.

17. The harness system of claim 11, wherein both the right leg loop and the left leg loop are formed of a single continuous length of webbing.

18. The harness system of claim 11, further comprising:

a chest harness, comprising:

a first chest harness strap;

a second chest harness strap;

a secondary attachment point, wherein the first chest harness strap and the second chest harness strap pass through the secondary attachment point;

a chest harness padding coupled to the first chest harness strap and the second chest harness strap; and a chest harness attachment loop, wherein the chest harness attachment loop is configured to reversibly couple with the primary attachment point, and wherein, while the chest harness attachment loop is reversibly coupled to the primary attachment point, the primary attachment point cannot be uncoupled from the attachment slot.

19. The harness system of claim 18, wherein the chest harness is reversibly coupled to the primary attachment point via girth-hitching of the chest harness attachment loop to the primary attachment point.

* * * * *